(12) United States Patent
Shan et al.

(10) Patent No.: US 8,068,824 B2
(45) Date of Patent: Nov. 29, 2011

(54) AUTOMATED RECONNECTION OF INTERRUPTED VOICE CALL SESSION

(75) Inventors: Xueshan Shan, Santa Clara, CA (US); Raji Chinnappa, Allentown, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 597 days.

(21) Appl. No.: 11/540,808

(22) Filed: Sep. 29, 2006

(65) Prior Publication Data

US 2008/0081627 A1    Apr. 3, 2008

(51) Int. Cl.
*H04M 3/42*    (2006.01)
(52) U.S. Cl. ........................ 455/417; 455/445
(58) Field of Classification Search ................. 455/417, 455/436, 412.1, 445, 414.1, 464, 427.1, 425, 455/426, 515, 73, 551, 421, 405, 501, 509, 455/561, 563, 435.1, 450.1; 370/335, 331, 370/342, 320; 379/206.01, 209.01, 210.01
See application file for complete search history.

(56) References Cited

U.S. PATENT DOCUMENTS

| | | | |
|---|---|---|---|
| 6,571,212 B1 * | 5/2003 | Dent ........................... | 704/270.1 |
| 6,804,509 B1 * | 10/2004 | Okon et al. ................. | 455/414.1 |
| 7,389,107 B1 * | 6/2008 | Satapathy ................... | 455/412.1 |
| 7,454,000 B1 * | 11/2008 | Henderson ............... | 379/142.04 |
| 7,539,127 B1 * | 5/2009 | Shaffer et al. ................. | 370/216 |
| 2002/0090947 A1 * | 7/2002 | Brooks et al. ................. | 455/436 |
| 2004/0203441 A1 * | 10/2004 | Smith ......................... | 455/67.11 |
| 2005/0048981 A1 * | 3/2005 | Anupam et al. ............. | 455/445 |
| 2005/0266836 A1 | 12/2005 | Shan | |
| 2006/0013149 A1 * | 1/2006 | Jahn et al. ...................... | 370/254 |
| 2007/0076697 A1 * | 4/2007 | Huotari et al. ................. | 370/352 |
| 2007/0140253 A1 * | 6/2007 | Daigle ........................ | 370/395.2 |
| 2007/0274488 A1 * | 11/2007 | Callaghan ............... | 379/201.01 |

\* cited by examiner

*Primary Examiner* — George Eng
*Assistant Examiner* — Jing Gao
(74) *Attorney, Agent, or Firm* — IP Spring Corporation

(57) ABSTRACT

Techniques are disclosed for automatically reconnecting an interrupted voice call session. For example, a method for use in a communication system switch for managing a call session between a first device and second device includes the following steps. The first device and the second device are connected, via the communication system switch, in accordance with a call session. The first device and the second device are automatically reconnected, via the communication system switch, when the call session is unintentionally interrupted. By way of example, the communication system switch may be a private branch exchange server.

20 Claims, 3 Drawing Sheets

AUTOMATED RECONNECTION OF INTERRUPTED VOICE CALL SESSION

FIELD OF THE INVENTION

The invention relates generally to the field of communication systems, and more particularly to techniques for automatically reconnecting an interrupted voice call session between two or more users.

BACKGROUND OF THE INVENTION

Unintended termination of a voice call between two call participants has plagued mobile communication networks since their inception. Typical reasons for such unintended termination of a call include sporadic connectivity and limited resources (e.g., battery level) of a mobile device used by at least one of the call participants. For example, a call is dropped when the mobile user device enters an area with poor or no service. Also, a call is dropped when the battery of the mobile user device is low or completely discharged and the device turns off.

While this may be a nuisance to casual users, it can have significant detrimental effects in a corporate voice communication network, particularly for users of so-called "smartphones" who rely heavily on such lines of communication to perform important business functions. As is known, a "smartphone" is a voice-centric communication device (i.e., voice communication and applications are the primary functions), which also provides secondary data-centric functions (e.g., phonebook, calendar and task list).

Thus, due to their multi-functionality, it is no surprise that smartphones have become an important part of a corporate voice communication network. Many corporate users are constantly on the move and use their smartphones as their only PBX (private branch exchange) extension. Unfortunately, a voice call between a corporate smartphone and a corporate PBX desktop extension, or other forms of extensions, can be suddenly lost due to the sporadic connectivity and/or limited resources of the smartphone.

If this occurs, one of the parties then needs to manually redial the other party to continue the call. Since the user of the PBX desktop extension does not know if the conditions that led to the dropped call have been corrected or dissipated, that party may need to try several times to get reconnected with the corporate smartphone user to continue an important conversation. This can be a source of great frustration, and even revenue loss, to both parties.

It is apparent from the foregoing that a need exists for techniques for automatically reconnecting an interrupted voice call session.

SUMMARY OF THE INVENTION

Principles of the present invention provide techniques for automatically reconnecting an interrupted voice call session.

For example, in one aspect of the invention, a method for use in a communication system switch for managing a call session between a first device and second device includes the following steps. The first device and the second device are connected, via the communication system switch, in accordance with a call session. The first device and the second device are automatically reconnected, via the communication system switch, when the call session is unintentionally interrupted. By way of example, the communication system switch may be a private branch exchange server.

In one embodiment, the automatic reconnection step may further include the steps of: (i) monitoring, at the communication system switch, receipt of a keep alive signal received from at least one of the first device and the second device; (ii) monitoring, at the communication system switch, receipt of a call termination signal from at least one of the first device and the second device when the keep alive signal is not received from at least one of the first device and the second device; (iii) monitoring, at the communication system switch, receipt of a resume-connectivity signal from at least one of the first device and the second device when a call termination signal is not received from at least one of the first device and the second device; (iv) monitoring, at the communication system switch, receipt of a voice channel availability signal from at least one of the first device and the second device when a resume-connectivity signal is received from at least one of the first device and the second device; and (v) re-establishing, via the communication system switch, the call session between the first device and the second device when a voice channel availability signal is received from at least one of the first device and the second device.

Further, the automatic reconnection step may include the step of receiving, at the communication system switch, call status information and presence status information from at least one of the first device and the second device. At least one of the first device and the second device may be remote from the communication system switch performing the connection and automatic reconnection steps. The call session may be unintentionally interrupted due to a loss of network connectivity of at least one of the first device and the second device or a limitation of a resource associated with at least one of the first device and the second device. The call session may be a Voice over Internet Protocol session.

In another aspect of the invention, a communication device for use in participating in a call session between the communication device and another communication device includes a memory; and a processor coupled to the memory and operative to: (i) transmit, at different times and based on different criteria, a keep alive signal, a resume-connectivity signal and a voice channel availability signal to a communication system switch which connected the communication device and the other communication device in accordance with a call session such that the communication system switch can automatically reconnect the communication device and the other communication device when the call session is unintentionally interrupted.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that while the present invention will be described below in the context of a corporate voice communication network, the invention is not so limited. That is, the present invention is more generally applicable to any communication network in which it would be desirable to automatically reconnect an interrupted communication session between two or more users. Thus, while illustrative embodiments described below refer to smartphones, it is to be understood that techniques of the invention can be implemented with other types of communication devices (e.g., cellular phone, voice-capable personal digital assistant).

Figure 1:
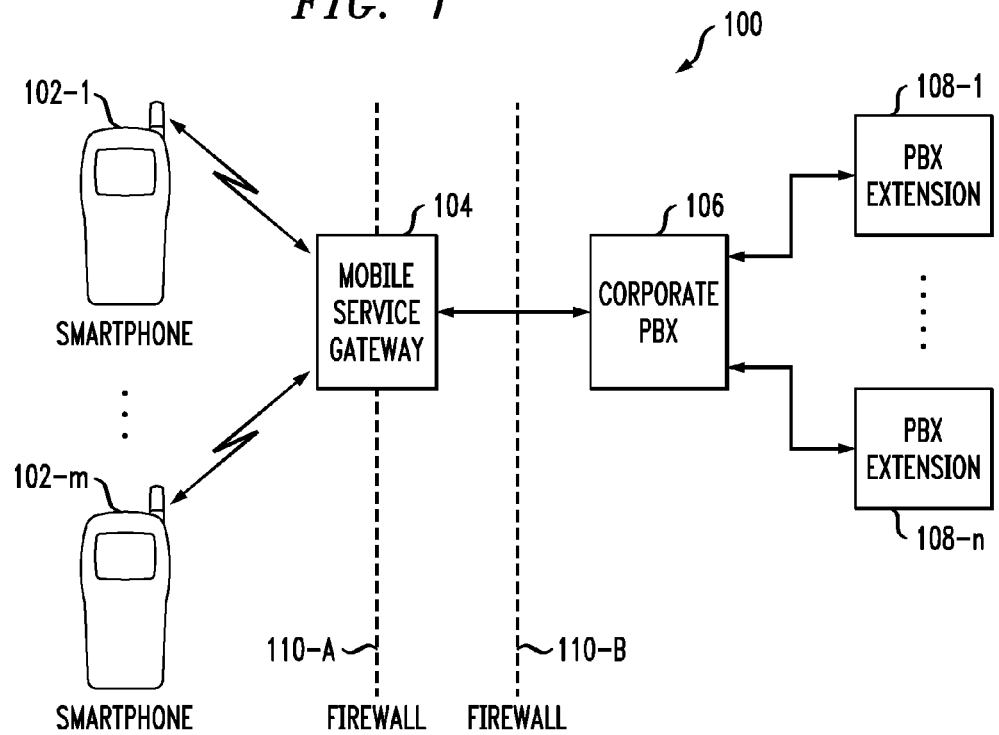
FIG. 1 illustrates components of a voice communication environment within which techniques of the invention may be implemented.

FIG. 1 illustrates components of a voice communication environment within which techniques of the invention may be implemented. As shown, environment 100 includes a plurality of mobile smartphones 102-1 through 102-m, mobile service gateway 104, corporate PBX server (or more generally referred to as a "communication system switch") 106, a plurality of PBX extensions 108-1 through 108-n and firewalls 110-A and 110-B. It is to be understood that FIG. 1 depicts network components used to explain illustrative techniques of the invention. As such, network environment 100 may include more or less components. Also, a PBX extension can be, by way of example, a desktop telephone, a softphone, or even another smartphone As is well known, a user of one of the plurality of smartphones (102-1 through 102-m), who is remote with respect to the corporate voice communication network, can conduct a voice call with a user of one of the plurality of PBX extensions (108-1 through 108-n), who is within the corporate voice communication network, via multiple service gateway 104 and PBX server 106. It is to be understood that the corporate voice communication network (to the right of dashed line in FIG. 1 representing firewall 110-B) is protected by firewall 110-B, while the remote network that the smartphone user is accessing (to the left of dashed line in FIG. 1 representing firewall 110-A) is protected by firewall 110-A. Communications thus pass between the smartphone user and the PBX extension user via the gateway, firewalls, and PBX server, as shown.

It is to be appreciated that any appropriate communication protocol or protocols can be used to conduct the voice call. By way of example, the voice call can be handled by a Session Initiation Protocol (SIP)-based Voice over Internet Protocol (VoIP). However, the invention is not limited to any particular communication protocol.

As will be explained in detail below, illustrative principles of the invention provide a methodology for corporate PBX server 106 to automatically reconnect parties (e.g., user of smartphone 102-1 and user of PBX extension 108-1) involved in an abnormally terminated (interrupted) voice call due, for example, to the loss of connectivity of the smartphone. The resumption of the abnormally terminated call session is based on the smartphone's connectivity and the user's availability for voice communication at the smartphone.

In general, in one embodiment, a software agent resident on the smartphone records the call status and information associated with the other parties participating in the call (caller identifiers or IDs of other parties) when abnormal disconnection occurs. The smartphone notifies the PBX server when it is available to resume network connectivity, i.e., when it is able to regain access to the network (e.g., when the smartphone moves back in an area with adequate service coverage). With this information, the PBX server can efficiently reconnect all parties based on call status, caller IDs, and the availability of a voice channel on the smartphone. Advantageously, manual redialing by any party in the dropped call is eliminated. Also, such an automated reconnection feature can serve as a value-added service in an enterprise voice communication network in order to provide more sophisticated integration of smartphone with a corporate PBX, and thereby improve employee productivity.

In order to implement such reconnection methodology, a data channel is established between the smartphone and the corporate PBX server (via the mobile service gateway). This data channel is represented by the arrows shown in FIG. 1 between the smartphone and PBX server (which also represent the voice channels). Just before accepting a call (incoming or outgoing), the smartphone and PBX server perform a data exchange sharing the session ID details for the subsequent call. The session details minimally include a session ID, but also may include the caller ID, the called ID and presence events of the called party.

As will be further explained below, principles of the invention provide for the smartphone to periodically send, e.g., once per minute, a periodic keep alive (heartbeat notification) message to the PBX server via the established data channel. When the PBX server realizes that the keep alive has not been sent in a period greater than one minute and that a call termination signal has not been received, then the PBX would reconnect. When the call ends, the smartphone sends a call termination indication. The session information is captured at the beginning of the call and replayed periodically and also when call is normally terminated.

Figure 2:
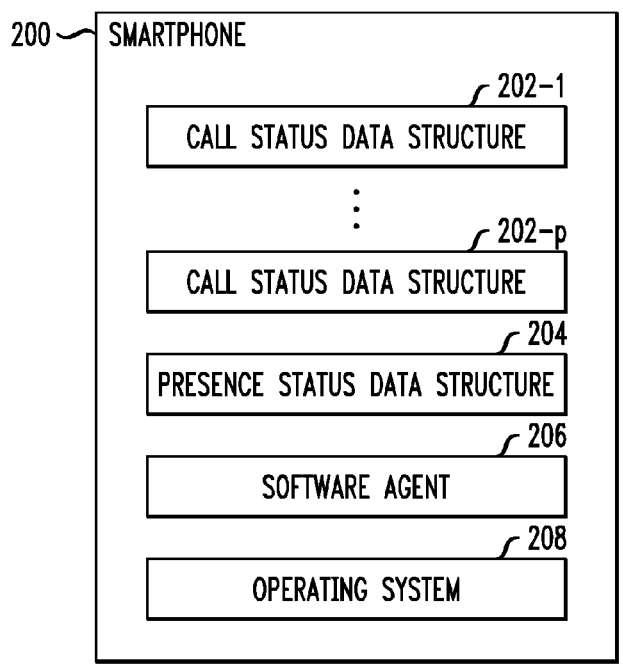
FIG. 2 illustrates organization and storage of information in a smartphone within which techniques of the invention may be implemented.

FIG. 2 illustrates organization and storage of information in a smartphone within which techniques of the invention may be implemented. As shown, smartphone (represented as 200 in FIG. 2) includes a plurality of call status data structure 202-1 through 202-p. These data structures are used by the smartphone to store call status information as well as caller IDs of the other call participants. The smartphone also includes presence status data structure 204, which stores information indicative of the user's presence (described in more detail below). The smartphone also includes software agent 206, which is the component in the smartphone that manages the storage of the information stored in data structure 202-1 through 202-p and data structure 204, and sends the keep alive message to the PBX. Also, as is known, the smartphone has a resident operating system 208, which controls overall functionality of the device.

Thus, in one embodiment, each smartphone runs device-resident software agent 206 in the background (i.e., while typical call operations are performed). The agent tracks and records (in data structures 202-1 through 202-p) the call status and information about all parties involved in the call. The software agent also captures presence information about the device and the user and stores the information in data structure 204. Examples of presence information include information pertaining to a user's activities, channel usage, communication activities. This information is also reported to corporate PBX server 106 via mobile service gateway 104 upon presence status change.

After a call is established, the smartphone's software agent sends heartbeat notification signals (keep alive messages) to the corporate PBX in a predetermined time interval. The PBX receives regular heartbeat signals during the entire voice session, if the smartphone's reception or connectivity is normal. The PBX receives a normal-termination notification from the smartphone at the end of the session, if the voice call is terminated normally.

If no heartbeat signal is received during a specified time interval or time out, then the PBX server assumes that an abnormal disconnection has occurred at the smartphone. The PBX server records the call status and temporarily terminates the call. The PBX server also sets a time out waiting for a notification from the smartphone that it has regained connectivity to the network. The notification contains a session ID (associated with the interrupted call), call status and all parties' information.

When the PBX server receives the notification before time out, it first checks for the availability of the voice channel and user's presence at the smartphone based on the presence information reported by the smartphone's software agent. If the voice channel is available and the user is also available, the PBX server reconnects parties and resumes the suspended session. The voice session will continue until its normal termination or another such interruption.

The PBX server permanently terminates the call if no resume-connectivity notification is received from the smartphone before time out or if the voice channel or user is not available during the specified time out.

It is to be understood that the notifications and presence updates may be transmitted, for example, via Short Message Service (SMS), Web Services, or Session Initiation Protocol (SIP). Enterprise mobile service gateway 104 passes data back and forth between smartphones and the PBX servers behind corporate firewalls via an established data channel. The gateway provides corporate smartphone users controlled access to the enterprise services available at servers behind firewalls. In one embodiment, data transmitted between smartphone clients and corporate PBX servers are end-to-end encrypted at the application layer. Furthermore, authentication and permission protocols may be used to minimize the possibility of misuse of the information.

Figure 3:
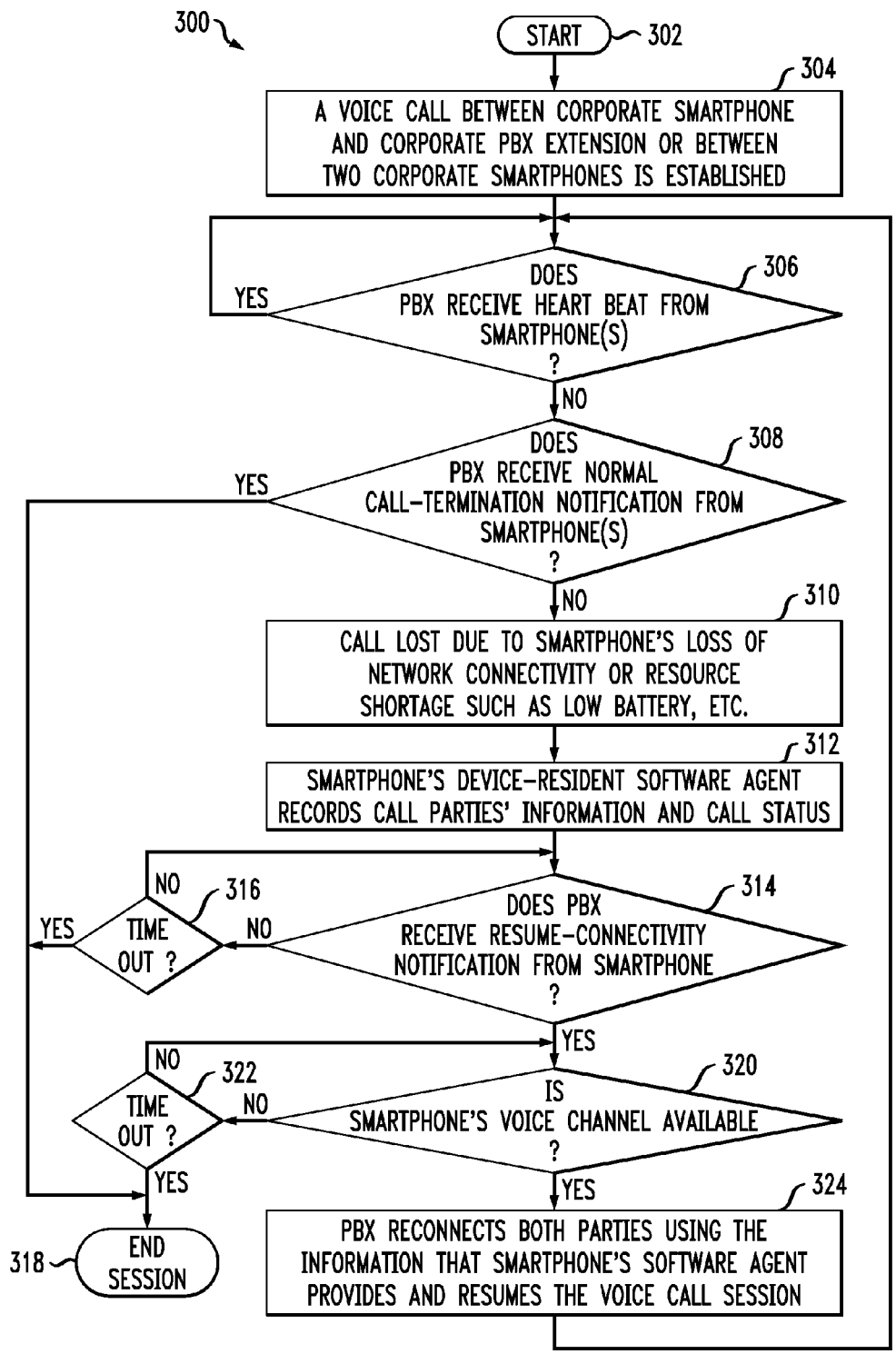
FIG. 3 illustrates a voice call processing methodology according to an embodiment of the invention.

FIG. 3 illustrates a voice call processing methodology according to an embodiment of the invention.

As shown, process 300 begins at block 302. In step 304, a voice call between a corporate smartphone and a corporate PBX extension is established. Also, a data channel is established therebetween.

In step 306, it is determined whether the PBX server received a heartbeat from the smartphone. If yes, the PBX server continues to monitor such signal.

If the PBX server does not receive the heartbeat, in step 308, it is determined whether the PBX server received a normal call-termination notification from the smartphone. If yes, then the call session is ended (block 318).

If not, in step 310, it is assumed that the call was lost due to the smartphone's loss of network connectivity or resource shortage (e.g., low battery).

In step 312, the smartphone's device-resident software agent records call parties' information and call status.

In step 314, it is determined whether the PBX server received a resume-connectivity notification from the smartphone. If not, a first time out counter is checked (316). The PBX server waits for the resume-connectivity notification until the time out expires, at which time, it ends the session (318).

If the PBX server receives the resume-connectivity notification before the end of the first time out, in step 320, it is determined whether the PBX server received notification that the smartphone's voice channel is available. If not, a second time out counter is checked (322). The PBX server waits for the voice channel availability notification until the time out expires, at which time, it ends the session (318).

If the PBX server receives the voice channel availability notification before the end of the second time out, in step 324, the PBX server reconnects the smartphone and the PBX extension using information that the smartphone's software agent provided, and thus resumes the voice call session. The PBX server then returns to step 306 to again monitor the heartbeat signal from the smartphone. The process can be repeated if the session is again abnormally interrupted.

It is to be understood that, if the voice call session is between two smartphones, the PBX server monitors heartbeats and receives notifications from both devices such that the call is automatically reconnected regardless of which smartphone causes the abnormal interruption. Furthermore, while the examples above refer to two-party calls, it is to be understood that the automated process can easily be applied to more than two-party calls.

Figure 4:
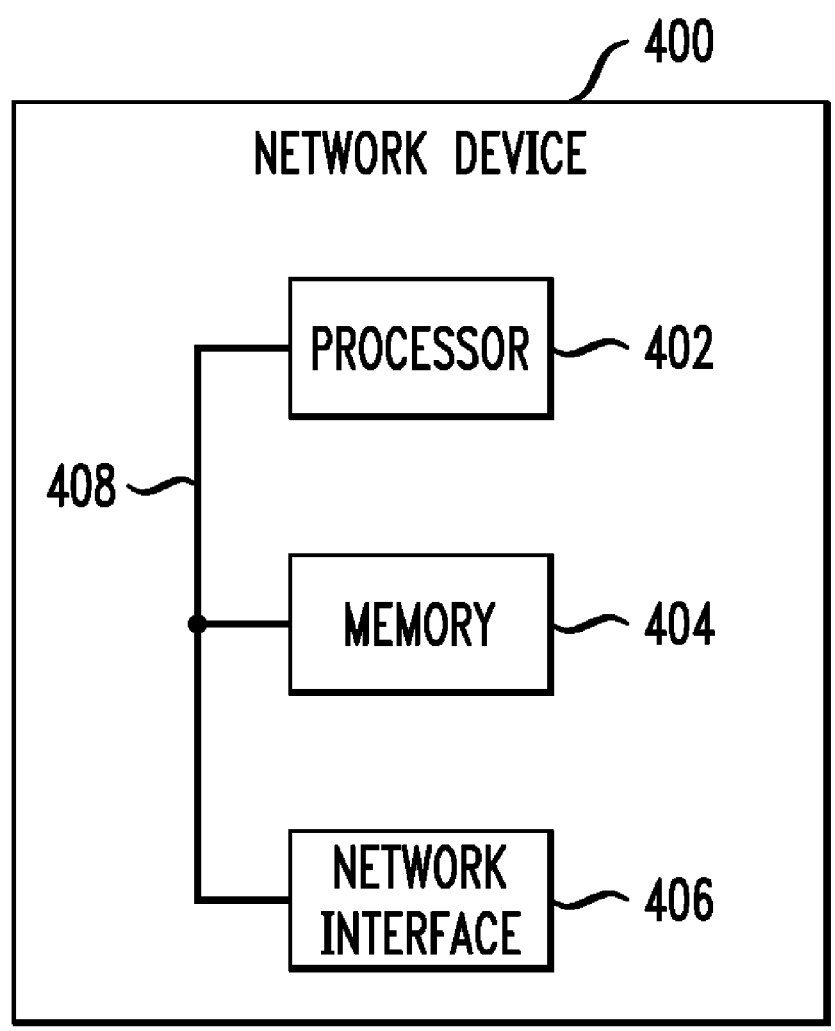
FIG. 4 illustrates a computing architecture of a device for use in implementing a voice call processing methodology according to an embodiment of the invention.

Turning now to FIG. 4, a computing architecture 400 of a device for use in implementing a voice call processing methodology, according to an embodiment of the invention, is illustrated. That is, FIG. 4 may be considered a computing architecture used to implement a smartphone, a gateway, a firewall, a PBX server and/or a PBX extension, as shown in FIG. 1. Of course, it is to be understood that the invention is not limited to any particular computing system implementation.

In this illustrative implementation, a processor 402 for implementing at least a portion of the methodologies of the invention is operatively coupled to a memory 404 and a network interface 406 via a bus 408, or an alternative connection arrangement.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

Further, the phrase "network interface" as used herein is intended to include, for example, one or more devices capable of allowing the computing system 400 to communicate with other computing systems. Thus, the network interface may comprise a transceiver configured to communicate with a transceiver of another computer system via a suitable communication protocol.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Advantageously, as explained in detail above, illustrative principles of the invention solve the problem or interruption caused by a sudden loss of reception or network connectivity of a corporate smartphone during a voice call session with a corporate PBX desktop extension or other type of extension (e.g., mobile extension). The resumption of the abnormally terminated call session is based on the smartphone's connectivity and the user's availability for voice communication at the smartphone. Since the proposed system is event-based, the PBX can efficiently reconnect all parties at the appropriate time based on call status, caller IDs, and the availability of voice channel on the smartphone. The method eliminates the redundant attempts at redialing and the associated frustrations.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   establishing, by a data-processing system, a communications session that connects a first terminal to a second terminal;
   detecting, by the data-processing system, that the first terminal disconnected from the communications session when the data-processing system fails to receive a keep-alive message from the first terminal within a first temporal interval, wherein the keep-alive message notifies the data-processing system that the first terminal has connectivity to a network;
   waiting, by the data-processing system, for receipt of:
      i. a resume-connectivity message that is automatically transmitted from the first terminal within a second temporal interval, and
      ii. a voice-channel-availability message that is automatically transmitted from the first terminal within a third temporal interval;
   automatically re-establishing, by the data-processing system, the communications session between the first terminal and the second terminal when the data-processing system receives both the resume-connectivity message and the voice-channel-availability message; and
   terminating, by the data-processing system, the communications session when the data-processing system fails to receive at least one of the resume-connectivity message and the voice-channel-availability message from the first terminal;
   wherein the keep-alive, resume-connectivity, and voice-channel-availability messages are different; and
   wherein the first, second, and third temporal intervals applies only to determining when the keep-alive, resume-connectivity, and voice-channel-availability messages, respectively, are received.

2. The method of claim 1 wherein the resume-connectivity message notifies the data-processing system that the first terminal regained connectivity to the network.

3. The method of claim 1 wherein the resume-connectivity message comprises:
   i. a first identifier that identifies the communications session, and
   ii. a second identifier that identifies a telephone number of the second terminal, wherein the second identifier is different from the first identifier.

4. The method of claim 3 wherein the data-processing system automatically re-establishes the communications session between the first terminal and the second terminal based on the first identifier and the second identifier.

5. The method of claim 1 wherein the voice-channel-availability message notifies the data-processing system that the first terminal regained access to a voice channel of the network.

6. The method of claim 1 wherein the resume-connectivity message and the voice-channel-availability message are end-to-end encrypted at the application layer by the first terminal.

7. The method of claim 1 wherein the second temporal interval is established by the data-processing system when, and only when, the data-processing system fails to receive:
   i. the keep-alive message from the first terminal, and
   ii. a call-termination message from the first terminal, wherein the call-termination message is an indication that the communications session was terminated by a user at one of the first terminal and the second terminal.

8. The method of claim 1 wherein the third temporal interval is established after the second temporal interval, and wherein the third temporal interval is established by the data-processing system when, and only when, the data-processing system received the resume-connectivity message from the first terminal within the second temporal interval.

9. The method of claim 1 wherein the data-processing system receives the resume-connectivity message and the voice-channel-availability message from the first terminal via Short Message Service (SMS).

10. The method of claim 1 wherein the data-processing system receives the resume-connectivity message and the voice-channel-availability message from the first terminal via Session Initiation Protocol (SIP).

11. The method of claim 1 wherein the communications session is a Voice Over Internet Protocol (VOIP) session.

12. The method of claim 1 wherein the data-processing system is a private branch exchange switch.

13. A method comprising:
   establishing, by a data-processing system, a data channel with a first terminal;
   transmitting, by the data-processing system via the data channel, a first identifier and a second identifier to the first terminal after receiving a call from a second terminal:
      i. wherein the first identifier identifies the call,
      ii. wherein the second identifier identifies the second terminal, and
      iii. wherein the second identifier is different from the first identifier;
   establishing, by the data-processing system, the call between the first terminal and the second terminal after the first identifier and the second identifier have been transmitted to the first terminal;
   detecting, by the data-processing system, that the first terminal disconnected from the call, the detection being based on the data-processing system failing to receive a keep-alive message from the first terminal within a first temporal interval;
   waiting, by the data-processing system, for receipt of:
      i. a resume-connectivity message that is automatically transmitted from the first terminal within a second temporal interval, and
      ii. a voice-channel-availability message that is automatically transmitted from the first terminal within a third temporal interval; and
   automatically re-establishing, by the data-processing system, the between the first terminal and the second terminal based on the first identifier and the second identifier when the data-processing system receives both the resume-connectivity message and the voice-channel-availability message.

14. The method of claim 13 wherein the call is terminated when the data-processing system fails to receive at least one of:
   i. the resume-connectivity message from the first terminal within the second temporal interval, and
   ii. the voice-channel-availability message from the first terminal within the third temporal interval,
   iii. wherein the resume-connectivity message is different from the voice-channel-availability message.

15. The method of claim 14 wherein the second temporal interval is established by the data-processing system when, and only when, the data-processing system fails to receive:
   i. the keep-alive message from the first terminal within first temporal interval, wherein the keep-alive message notifies the data-processing system that the first terminal has connectivity to a network, and
   ii. a call-termination message from the first terminal, wherein the call-termination message is an indication that the call was terminated by a user at one of the first terminal and the second terminal.

16. The method of claim 14 wherein the second temporal interval is established after the first temporal interval, and wherein the second temporal interval is established by the data-processing system when, and only when, the data-processing system fails to receive the keep-alive message from the first terminal within the first temporal interval.

17. The method of claim 13 wherein the first terminal is in a first network, and wherein the data-processing system and the second terminal are in a second network that is different from the first network.

18. The method of claim 17 wherein the resume-connectivity message notifies the data-processing system that the first terminal regained connectivity to the first network.

19. The method of claim 13 wherein the voice-channel-availability message notifies the data-processing system that the first terminal regained access to a voice channel.

20. The method of claim 13 wherein the resume-connectivity message and the voice-channel-availability message are end-to-end encrypted at the application layer by the first terminal.

* * * * *